United States Patent
Magladry

[15] 3,660,228
[45] May 2, 1972

[54] NUCLEAR REACTOR CONTROL WITH REFLECTOR AND ABSORBER MEANS

[72] Inventor: Robert E. Magladry, Baltimore, Md.
[73] Assignee: Teledyne, Inc., Los Angeles, Calif.
[22] Filed: Nov. 6, 1967
[21] Appl. No.: 680,658

[52] U.S. Cl....................................176/20, 176/26, 176/42
[51] Int. Cl............................................G21c 7/00
[58] Field of Search........................176/20, 42, 92

[56] References Cited

UNITED STATES PATENTS

| | | |
|---|---|---|
| 3,164,525 | 1/1965 | Wetch et al..............................176/33 |
| 3,255,087 | 6/1966 | Maldagae.................................176/42 |
| 3,285,822 | 11/1966 | Ackroyd..................................176/42 |
| 3,351,534 | 11/1967 | Magladry.................................176/42 |
| 3,361,636 | 1/1968 | Baage.......................................176/42 |

FOREIGN PATENTS OR APPLICATIONS 963,161    7/1964    Great Britain

*Primary Examiner*—Reuben Epstein
*Attorney*—Fleet, Gipple & Jacobson

[57] ABSTRACT

A nuclear reactor of the metal hydride control type. Metal hydride is in two portions, one in the core and the other exterior of the core, and means are provided for permitting flow of hydrogen between the two portions. Control of reactivity is obtained by providing heating means in one or both portions, the heating being responsive to a neutron sensor.

13 Claims, 2 Drawing Figures

INVENTOR
ROBERT E. MAGLADRY 3,660,228

NUCLEAR REACTOR CONTROL WITH REFLECTOR AND ABSORBER MEANS

CROSS-REFERENCES TO RELATED APPLICATION

This application relates to U.S. Pat. No. 3,351,534 to Robert Magladry, entitled "Hydrogen Diffusion Reactivity Control".

BACKGROUND OF THE INVENTION

1. Field of the Invention

The invention pertains to the nuclear reactor field and to reactivity regulating systems for the same, especially fast spectrum reactors in which control is achieved by neutron reflection or absorption.

2. Description of the Prior Art

In the nuclear reactor field, reaction control is achieved in three ways; by absorption, by moderation and by reflection of the neutrons, which are born very fast. Where control is achieved by reflection, the primary function of the reflector is to return the fast neutrons back to the core as these neutrons tend to leak out of the core. The best reflector materials are those which have the higher masses.

The present invention is, therefore, directed to the application of the control principle set forth in the above-referred to patent, to a fast or intermediate spectrum reactor in which nuclear reaction is controlled by reflecting, back to the core, the fast neutrons emitted by the same.

In this respect, the control comprises a self-regulating, mechanically passive system which employs a first portion of metal hydride material within the reactor core or forming the same operatively coupled with the nuclear reactor fuel, and a second portion of metal hydride material, exterior of the core. An applied temperature differential between the hydride material portions causes disassociated hydrogen to move therebetween with reactivity dependent upon the hydrogen concentration within the core metal hydride portion.

In the present invention, stable isotopic hydrogen (deuterium) which has a higher mass than normal hydrogen, when used in conjunction with its metallic hydride material, such as zirconium hydride or yttrium hydride, as the reflector, allows the control scheme to be employed most advantageously in a nuclear reactor with reaction controlled by reflection rather than moderation.

A secondary aspect of the basic control scheme involves creating a temperature differential between the portions of hydride material, specifically by the application of electrical energy to a heating coil surrounding the non-core portion of the hydride material. Applicable equally to a slow spectrum reactor of the control type in which the metal hydride material of the core acts as a neutron moderating material, this aspect of the present invention is directed to controlled reactor in which an electrical heating coil or other artificial heat producer is associated with either portion of hydride material, and wherein reactivity is controlled by varying, either in a positive sense or a negative sense, the applied electrical energy to the heating coil. A neutron sensor associated with the reactor core may provide the electrical signal or the signal maybe supplied by means sensitive to the output energy level to the reactor, as from a shaft-driven, electrical tachometer generator in a reactor power plant, etc. Further, reactivity control by absorption has been limited to slow reactors, since this type of control requires the neutrons to be thermalized prior to absorption.

SUMMARY OF THE INVENTION

This invention relates generally to nuclear reactors of the fast or intermediate type, and one aspect is directed to a completely passive metal hydride control system involving either controlled neutron reflection or absorption. In either case, first and second thermally and environmentally isolated metal hydride portions are employed with means fluid coupling said portions to allow disassociated hydrogen to reversibly flow therebetween. Nuclear fuel material is operatively coupled to one of the portions, means are provided for heating one of the portions independently of reaction and a neutron sensor or other reactor associated means are employed for sensing the level of reactivity and the output of the neutron sensor is applied to the independent heating means to variably heat one of the metal hydride portions in proportion to the level of reactivity. Alternatively, where the reactor is employed in a power plant, a tachometer generator coupled to the plant output shaft derives a signal proportional to shaft rotation which is fed to the independent heating means. For controlled neutron reflection, the sealed containers containing the metal hydride also contains isotopic hydrogen which, in conjunction with the metal hydride, acts as a fast neutron reflector. Applying a temperature differential between the container achieves isotopic hydrogen transfer therebetween to vary the effectiveness of the reflector. Where control is achieved by neutron absorption, the portion of metal hydride operatively coupled to the reactor fuel carries a neutron absorption material with the metal hydride acting to thermalize the fast neutrons which are then absorbed by the neutron absorption material. Typically, the neutron absorption material comprises boron, europium, cadmium, gladolinium, hafnium, samarium, dysprosium, etc. and alloys thereof.

DESCRIPTION OF THE PREFERRED EMBODIMENT

Figure 1:
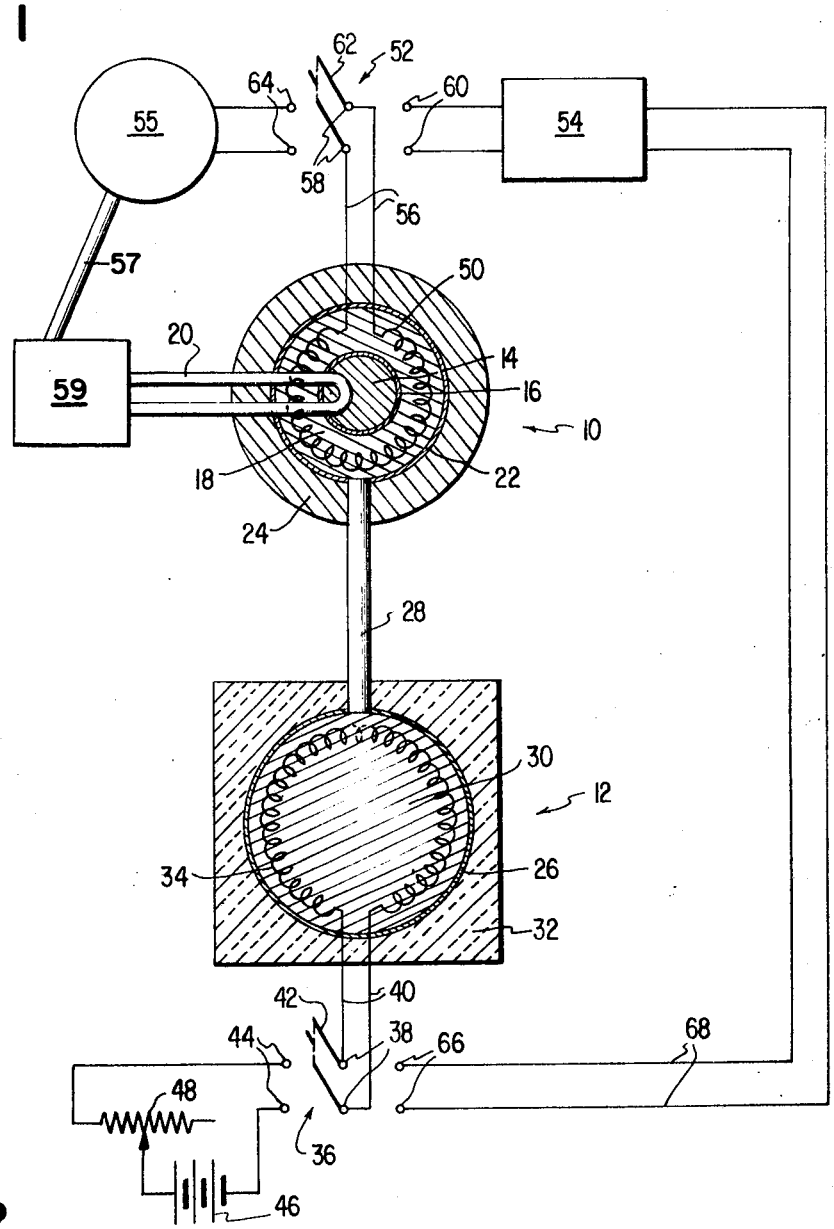
FIG. 1 is a schematic view of a fast spectrum reactor employing the zirconium deuterium reflector control means of the present invention.

The present invention is particularly applicable to, but not necessarily limited to, a fast or intermediate spectrum nuclear reactor which makes use of the mechanically passive control system. Referring to the drawing, there is shown schematically a nuclear reactor including a core section indicated generally at 10 and a reservoir section indicated generally at 12 which is thermally isolated therefrom. Referring to the core section 10, there is provided centrally of the reactor a heavily fueled core 14. The core 14 which may comprise a sphere of appropriate size of U-235 fuel, for instance, is surrounded by a thin shell 16 of metal such as molybdenum for instance, or stainless steel, which merely prevents internal migration of hydrogen in isotopic form to core 14, the hydrogen being carried by the next concentric member, reactor reflector 18. While not especially pertinent to the present invention, but exemplary of reactor utility, there is provided a single loop tube or conduit 20 forming a reactor coolant passage, which functions to remove the heat of reactivity. The heated coolant is appropriately applied to thermal energy transforming means, in the form of a thermal-to-mechanical energy converter, such as a Sterling engine, etc., or a direct conversion means such as thermoelectric elements. In any case, the tube 20 acting as the passage for coolant to the reactor fuel 14 passes through the reflector 18 which surrounds the fueled core 14. The reflector comprises suitable metal hydride material. In like manner to shell 16 between the fueled core 14 and the reflector, there is also provided a thin outer reflector shell 22 of metal which acts to prevent hydrogen in isotopic form from leaking out of the reflector. While the coolant is shown as passing through a tube, the thin shell 16 would prevent coolant from leaking out of the core 14 if the coolant were circulated in contact with the fuel and reflector rather than in a separately formed conduit. Further, it is not necessary that the metal hydride reflector 18 form the total means of neutron reflection. Preferably, exterior of the large shell 22, there is provided a heavy metal reflector 24. The reflector may be formed of any suitable heavy metal, such as copper, lead or thorium. While the reactor core portion 10 is shown as being spherical and circular in cross-section, it could conceivably be of some other shape, such as cylindrical.

The reactor core 14 is comprised of some fissile material, as U-235, and fissions, in which case neutrons are released from the fission process and as they are absorbed by other fuel portions, cause addition fissions resulting in the usual chain reaction. Some fraction of the neutrons produced tend to leak out of the fueled core 14, these being generally fast neutrons and in the absence of any mechanism within the fueled core 14 for thermalizing the neutrons or moderating them, the fast neutrons will be passed by the core 14 and would leak into the reflector region 18. In the reactor shown, it is not necessary that the fueled core 14 contain any moderator. If it does contain a moderator, it would be preferably to use hydrogenous material, but in general, the reflector technique of the present invention works best for reactors in which the fuel does not contain very much moderator. In other words, the present reactor is one which is characterized by fast spectrum and hence has a major neutron leakage problem. This type of reactor is particularly applicable for use on systems in which the temperatures are to high to be compatible with hydride material if such moderator were used in conjunction with the fueled core 14.

The neutrons leaking out of the fueled core 14 collide with the metal hydride reflecting material. The material forming the reflector 18 being one of higher mass, the normal atomic hydrogen is advantageously replaced with heavier hydrogen; that is, hydrogen in isotopic form, which, in conjunction with the metal hydride, forms a highly efficient fast neutron reflector. One form of isotopic hydrogen, which is stable, is deuterium which has a higher mass than normal hydrogen which is made up of two isotopes of hydrogen, both deuterium and light hydrogen. When used with a zirconium alloy or yttrium, highly efficient reflection of fast neutrons results, contrasting to the H-Rho control systems of employing normal hydrogen and its metallic hydride as a moderator. Thus, basically, the invention achieves control of a reactor by the reflection of fast neutrons. In conjunction with the H-Rho mechanically passive control system, the present invention advantageously uses hydrogen in the form of deuterium.

For increased efficiency and response, the reflector 18 may be seeded with some small amount of uranium fuel, since the effective operation of the control process depends upon the thermal communication between the active fuel and the hydride material. Thus, the most effective way of communication between the fuel and reflector is to add a small amount of fissional material to the reflector so that the neutrons which do leak out would also produce heat. However, there is some heating due to the energy deposited in the reflection process, as well as being due to the absorption of the leaked neutrons by the hydride material.

The neutrons which leak out of the fueled core 14 and move into the reflector 18 collide with the reflecting material and some finite fraction of these collisions result in neutrons being reflected, or in other words, being bounced back into the fueled core 14 where they can effectively participate again the fission process. The level of reflectivity of the reflector 18 is achieved by varying the concentration of deuterium (isotopic hydrogen) within the reflector 18. In this respect, as in all control processes, it is necessary to connect the reflector or first sealed container of hydride material, surrounding the core, to a second sealed and thermally isolated metal hydride material container forming reservoir 12. The reservoir 12 comprises a shell 26, which may be spherical in shape, of suitable metal, such as stainless steel, molybdenum, beryllium, etc., which surrounds and holds a mass of hydride material 30. The containers formed by shell 22 in the core section and shell 26 in the reservoir section are fluid coupled by a connecting tube 28, also formed of stainless steel. The reservoir section 12 is completed by surrounding shell 26, which may be of spherical shape, with thermal insulation material 32, the metal hydride mass 30 being embedded in an electrical heating coil 34. This aspect of the invention is functionally the equivalent of the basic teaching of the referred to patent. The mass of hydride material 30 comprises material which is compatible with the reflector material 18. In the present case, for a fast spectrum reactor involving relatively high temperatures, yttrium might be a more appropriate material than zirconium for both reflector 18 and reservoir mass 30. The electrical heating coil 34 within the reservoir section 12 of the reactor may be selectively coupled to a source of electrical energy by means of a double pole, double throw switch 36 carrying contacts 38 coupled to coil 34 through lines 40. The contacts 38 are selectively coupled by means of movable switch member 42 to contacts 44 coupled to battery 46. The applied current is selectively regulated by series rheostat 48.

As thus defined, the startup and control system is essentially the same as that set forth in the referred to patent, except that instead of the metal hydride material within the core performing a moderating function, the material acts in conjunction with isotopic hydrogen to form an effective neutron reflector. The level of reactivity is increased or decreased by increasing the current flow to the heating coil 34 or decreasing the same to thereby cause disassociated deuterium to flow.

The present invention is further directed to a control arrangement which is also applicable to slow spectrum reactors. In the present case, this control function is achieved through the employment of a heating coil 50 embedded within or carried by reflector 18 within the core section 10. The electrical heating coil 50 is coupled by means of double pole, double throw switch 52 to either a neutron sensor, indicated schematically by block 54, or to a tachometer generator 55 which may, for instance, be coupled to the output shaft 57 of a mechanical converter 59 which is driven by the coolant circulated through coolant tube 20. Assuming that switch 52 is thrown to the right, the electrical coil leads 56 are connected through terminals 58 and 60 to the neutron sensor 54 by movable switch member 62. An electrical signal which is proportional to neutron flux level is delivered by the sensor 54 and is fed through terminals 56 to the electrical heaters 50 to form the control feedback loop. The zirconium deuterium reflector acts in conjunction with the heating coil, the neutron sensor feedback loop receiving a signal responsive to the neutron flux output for controlling or maintaining reactivity.

Instead of operating the reactor at a constant neutron level, it may be more desirable to maintain an output shaft at a constant rotational speed with this signal being used to control feedback through either a reflector heater or the heater associated with the reservoir. In the embodiment shown, the movable member 62 of the double pole, double throw switch 52 may be moved to the left such that leads 56 are now coupled to terminals 64 of a rotating power plant shaft coupled tachometer generator 55.

The double pole, double throw switch 36 performs another function other than coupling the reservoir heater 34 to a manually controlled source of electrical current for achieving startup and setting the level of reactivity by controlling the thermal energy applied to the metal hydride reservoir section. The switch member 42 can be flipped to the right to complete the electrical connection between leads 40 and a pair of fixed contacts 66 at the ends of electrical leads 68, which are also coupled to neutron sensor 54. Thus, the neutron sensor may be coupled to the electrical heater 50 associated with the neutron nuclear reactor core section 10, or to the heading coil 34 of the reservoir. In this respect, means (not shown) are carried by the neutron sensor 54 for inversely applying electrical current through leads 68 to the reservoir heating coil 34, since if the neutron sensor senses an increase in reactivity, it is necessary to reduce the temperature of the reservoir section so that disassociated deuterium will flow from reflector 18 to the reservoir hydride section 30. Thus, in either form, the neutron sensor selectivity feeds an electrical signal in a positive manner to the reflector heating coil 50, or in a negative manner to the electrical coil 34 carried by the reservoir section 12. Further, the same control function may be achieved through signals received from either the shaft rpm sensor 55 or the thermoelectric converter (not shown).

Figure 2:
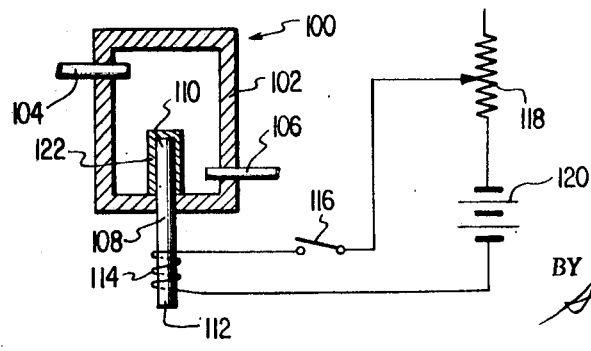
FIG. 2 is a schematic representation of a modified fast reactor of the present invention which employs neutron absorption as the basis for reactivity control.

Neutron absorption provides relatively inefficient control for a fast or intermediate reactor, because the absorbing materials do not have large enough cross-sections to be very effective with respect to fast neutrons. The control concept may be readily applied to an otherwise standard absorption control system to correct this apparent deficiency. The key to the solution of the problem involves surrounding moderator material with an amount of absorbing material. Here moderating material then slows the neutrons down and permits the absorbing material to be effective in the vicinity of the moderating material, or alternately surrounding the absorbing material with moderating material to produce the same effect. Previous neutron absorption control schemes have involved mechanically moving the absorption material relative to the core and reflector means of a fast reactor to provide more or less absorption material in operative relationship to the reactor core. The absorption concept obviously has additional merit when coupled to the basic control process. The embodiment of FIG. 2 is quite similar to the embodiment shown in the referred to application in which the reactor, indicated at 100, consists of a container incorporating therein core and reflector means 102 which may readily include reactor fuel. Conduits 104 and 106 allow coolant to flow into and out of the reactor in conventional fashion. In similar fashion to the referred to patent, one or more passive control rods 108 of metal hydride material, such as zirconium, are coupled to the reactor 100 having an end or portion 110 of hydride material interiorly of the reactor and operatively coupled with the fuel material. The opposite end 112 of the hydride control rod extends exteriorly of the core and reflector means 102 and has wrapped thereabout an electrical heating coil 114 which may be selectively coupled by means of switch 116 and rheostat 118 to a source of electrical power, such as, battery 120. In the present embodiment, the in-core hydride portion 110 coaxially is enclosed by cylinder 122 of thermal neutron absorbing material, such as boron. The fast neutrons emitted by the fuel will become thermalized as they pass through the zirconium hydride material and then pass into the boron where they are readily absorbed. The employment of the metal hydride surrounded by boron jacket 122 allows the metal hydride passive control system to be applied to the absorption concept of reactor control in a similar manner to the employment of zirconium deuterium in the FIG. 1 embodiment which allows the reflector concept to be applied to reactor control. The thermalization of the neutrons passing through the zirconium hydride surrounding the boron insert 122 varies with the concentration of hydrogen within the core end of the rod 110. Obviously, increasing the current passing through electrical heater 114 increases the temperature differential between the inner end and the outer end of the rod, thus driving disassociated hydrogen from the outer end 112 to the core end 110 increasing neutron thermalization.

While the invention has been particularly shown and described with reference to a preferred embodiment, it will be understood by those skilled in the art that various changes in the form and details may be made therein without departing from the spirit and scope of the invention.

What is claimed is:

1. A metal hydride controlled reactor comprising: first and second thermally and environmentally isolated metal hydride portions, means for fluid coupling said metal hydride portions to allow disassociated hydrogen to reversibly flow therebetween, nuclear reactor fuel material, means for operatively coupling fuel to one of said portions, means for heating one of said portions independently of reaction, a neutron sensor for sensing the level of reactivity and means for operatively coupling said neutron sensor to said independent heating means for variably heating one of said metal hydride portions in proportion to the level of reactivity.

2. The reactor as claimed in claim 1 wherein one of said hydride portions forms a reservoir, said independent heating means is operatively coupled to said reservoir, said the signal from said neutron sensor to said independent heating means is inversely proportional to reactivity.

3. The reactor as claimed in claim 2 wherein said independent heating means is associated with said metal hydride portion operatively coupled to said fuel, and said electrical signal passing from said neutron sensor to said independent heating coil is directly proportional to core reactivity.

4. A controlled nuclear reactor comprising: a reactor core section in the form of a first sealed container housing reactor fuel and surrounded by a metal hydride and hydrogen in isotopic form and forming therewith a neutron reflector, a thermally isolated, second sealed container containing metal hydride and isotopic hydrogen, means fluid coupling said containers to allow disassociated isotopic hydrogen to pass reversibly therebetween, and second means for causing said hydrogen to reversibly flow between said containers as a function of reactivity changes within said core.

5. The reactor of claim 4 wherein said isotopic form of hydrogen is deuterium.

6. The reactor as claimed in claim 4 wherein said second means comprises an electrical heater carried by said first container in operative relative to said reflector and said reactor further includes means for delivering electrical current to said heater in direct proportion to the reactivity within said reactor.

7. The reactor as claimed in claim 6 further including a neutron sensor operatively coupled to said reactor core section and means for coupling said neutron sensor to said electrical heater to control the current delivered thereto.

8. The reactor as claimed in claim 6 for use in a power plant wherein said reactor causes mechanical shaft rotation, and said means for delivering electrical current through said heater comprises a tachometer generator operatively coupled to said rotating shaft.

9. The reactor as claimed in claim 4 wherein said second means comprises an electrical heater carried by said second container and said reactor further includes means for delivering electrical heater current to said electrical heater in inverse proportion to core reactivity.

10. The reactor as claimed in claim 9 wherein said means for delivering a current to said said heater comprises a neutron sensor operatively positioned with respect to said reactor core.

11. The reactor as claimed in claim 9 for use in a power plant having an output shaft which rotates in proportion to reactor power output and wherein said means for delivering electrical current to said heater comprises a tachometer generator coupled to said power plant output shaft.

12. An absorption controlled nuclear reactor comprising: reactor core and reflector means, first and second thermally and environmentally isolated metal hydride portions carried internally and externally of said core and reflector means, means for fluid coupling said portions to allow disassociated hydrogen to reversibly flow therebetween, nuclear fuel material carried by said reactor and operatively coupled to the internal metal hydride portion, neutron absorption material carried by said internal metal hydride portion and positioned in operative relationship therewith and means for independently applying a temperature differential between said metal hydride portions.

13. The reactor as claimed in claim 11 wherein said neutron absorbing material comprises one element selected from the group consisting of boron, europium, cadmium, gladolinium, hafnium, samarium, and dysprosium and alloys thereof.

* * * * *